No. 830,947. PATENTED SEPT. 11, 1906.
O. F. WHITEHURST.
MEANS FOR STARTING ALTERNATING CURRENT MACHINES.
APPLICATION FILED JAN. 28, 1905.
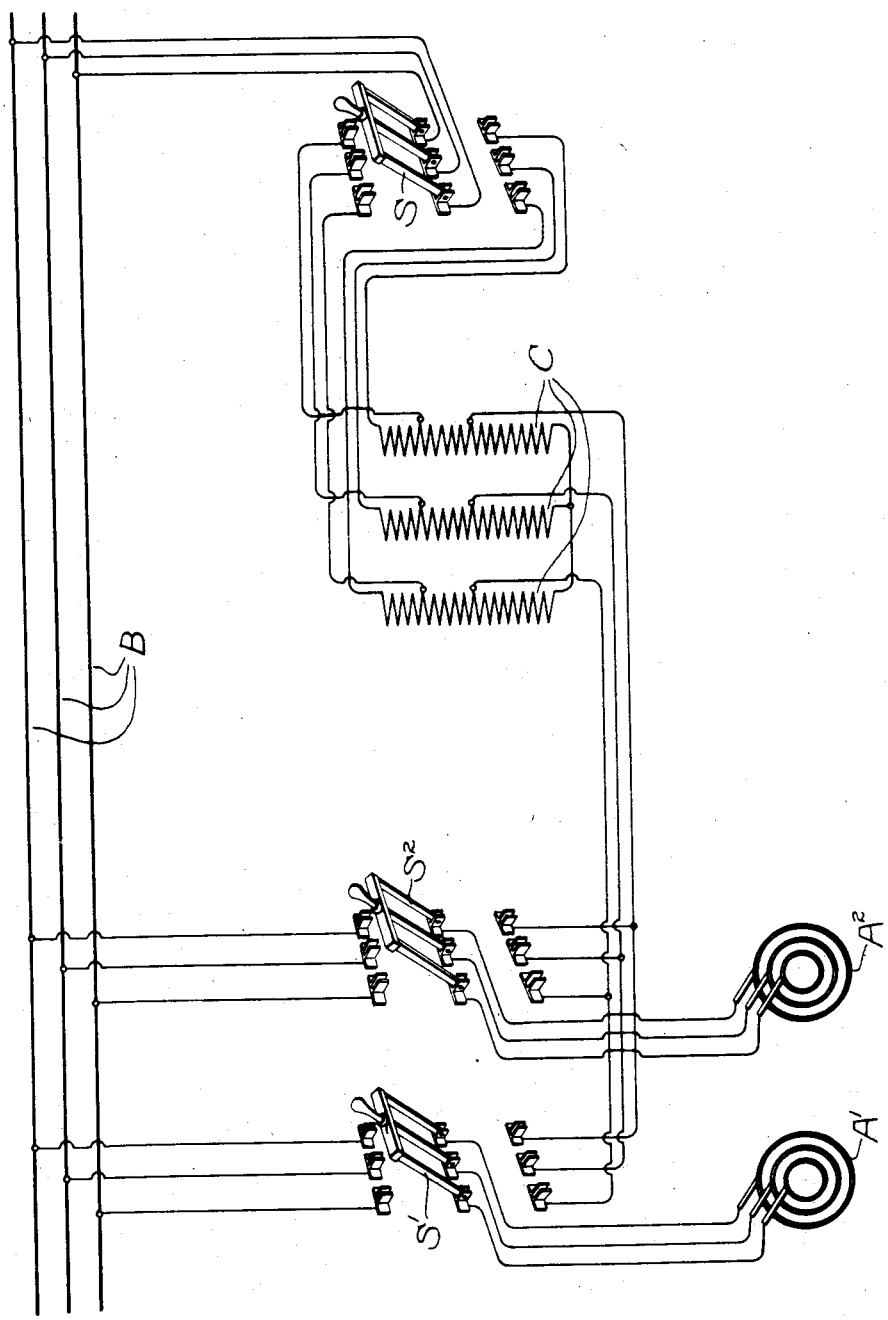
Witnesses:
Harold F. Cocke
Allen Oxford
Inventor:
Obed F. Whitehurst.
By _____
Att'y.

UNITED STATES PATENT OFFICE.

OBED F. WHITEHURST, OF SCHENECTADY, NEW YORK, ASSIGNOR TO GENERAL ELECTRIC COMPANY, A CORPORATION OF NEW YORK.

MEANS FOR STARTING ALTERNATING-CURRENT MACHINES.

No. 830,947.     Specification of Letters Patent.     Patented Sept. 11, 1906.

Application filed January 28, 1905. Serial No. 243,034.

*To all whom it may concern:*

Be it known that I, OBED F. WHITEHURST, a citizen of the United States, residing at Schenectady, county of Schenectady, State of New York, have invented certain new and useful Improvements in Means for Starting Alternating-Current Machines, of which the following is a specification.

My invention relates to the control of alternating-current machines; and its object is to provide a novel arrangement of starting devices comprising an improvement in the arrangement ordinarily employed in such cases whereby greater simplicity and reduced expense are secured.

In starting up a large alternating-current motor or a generator which is started as a motor it is ordinarily desirable further to impress a reduced voltage on the motor in order to prevent the rush of current which would occur if the full voltage of the circuit were impressed on the motor at the start. One arrangement frequently employed heretofore consists in providing a compensator and voltage-lowering transformer with means for connecting the motor to two or more points on its winding. When only two voltages are required for starting and for running, respectively, each motor requires merely a double-throw switch to connect it first to a point on the compensator or other voltage-regulator, so that a reduced voltage is impressed upon the motor for starting and then when it is up to speed to connect it to the line to receive the full voltage. For large motors two voltages are frequently insufficient for obtaining a gradual acceleration without an undue rush of current. If three voltages are required, the usual practice is to connect the motor first to a low-voltage point on the regulator, then to another point of higher voltage, and finally to the line. In this case it becomes necessary to employ two double-throw switches for each machine, since the construction of a triple-throw switch in large sizes would be impracticable. Since for circuits of high voltage and large current capacity the switches are necessarily expensive, the cost of providing two double-throw switches for starting each machine is considerable.

By my invention I am enabled to eliminate one of the double-throw switches for each machine and nevertheless to obtain three different voltages. To accomplish this end, I wind the compensator or other voltage-regulator for a voltage somewhat higher than that of the line to which it is to be connected, so that the line may be connected either to the total winding or to only a portion thereof, and I provide means for connecting each machine either to a point on the compensator or to the line—that is, I require a double-throw switch for the compensator and one double-throw switch for each machine. The expense of one double-throw switch for each machine is thereby eliminated, and this gain is offset only by the necessity of substituting a double-throw instead of a single-throw switch for the compensator, and since one compensator and its switch may be employed for starting a large number of machines this offset is a practically negligible consideration.

My invention will best be understood by reference to the accompanying drawings, in which $A'$ and $A^2$ represent two alternating-current motors or generators, which are indicated as three-phase and which are to be started as alternating-current motors supplied from the three-phase line or bus-bars B.

C represents a voltage-regulator, which I have shown as of the single-coil or compensator type, star-connected; but it will be understood that other forms of voltage-regulator may be employed, if desired.

S represents a double-throw switch adapted to connect the bus-bars either to the upper terminals of the compensator or to intermediate points on the winding.

$S'$ and $S^2$ represent double-throw switches for the machines $A'$ and $A^2$, respectively, and adapted each to connect its machine to an intermediate point on the winding of the compensator or to the bus-bars B.

In starting up the machine $A'$ the switches S and $S'$ are both thrown downward. The bus-bars B are thereby connected to the terminals of the compensator C, and the machine $A'$ is connected across a portion of the compensator-winding. A voltage is thereby impressed upon the machine $A'$ dependent upon the ratio of that portion of the compensator to the entire winding. For the second voltage the switch S is thrown upward, connecting the bus-bars B to a portion only of the compensator-windings. The ratio of primary to secondary turns is thereby decreased, and the voltage impressed upon the machine A' is increased. For the third and final voltage the switch S' is thrown upward, thereby connecting the machine A' directly to the bus-bars B. The switch S may then be opened, disconnecting the compensator from the bus-bars B, or it may be thrown downward for the purpose of starting up the second machine A².

It will be seen from the above description that only a single double-throw switch is required for each machine and a double-throw switch for the compensator, while at the same time three different voltages are available for starting each machine.

What I claim as new, and desire to secure by Letters Patent of the United States, is—

1. In combination, an alternating-current machine, a circuit to which said machine is to be connected, a voltage-regulator, means for impressing the voltage of said circuit upon the whole or upon a portion of said regulator, and means for connecting said machine to said regulator or to said circuit independently of said regulator.

2. In combination, an alternating-current machine, a circuit to which said machine is to be connected, a voltage-regulator, a double-throw switch adapted to connect the whole or a portion of the winding of the regulator to said circuit, and a double-throw switch adapted to connect said machine to said regulator or to said circuit.

3. In combination, an alternating-current machine, a circuit to which said machine is to be connected, a compensator, a double-throw switch adapted to connect the whole or a portion of the winding of said compensator to said circuit, and a double-throw switch adapted to connect said machine to a portion of said compensator-winding or to said circuit.

4. In combination, a plurality of alternating-current machines, a circuit to which said machines are to be connected, a voltage-regulator, a double-throw switch adapted to connect the whole or a portion of said regulator to said circuit, and a double-throw switch for each machine adapted to connect its machine to said regulator or to said circuit.

5. In combination, a plurality of alternating-current machines, bus-bars, a compensator, a double-throw switch adapted to connect the whole or a portion of the compensator-winding to said bus-bars, and a double-throw switch for each machine adapted to connect its machine to a portion of said compensator-winding or to said bus-bars.

In witness whereof I have hereunto set my hand this 27th day of January, 1905.

OBED F. WHITEHURST.

Witnesses:
BENJAMIN B. HULL,
HELEN ORFORD.